(12) United States Patent
Kindermann

(10) Patent No.: US 7,070,495 B2
(45) Date of Patent: Jul. 4, 2006

(54) MEAT ROLLING DEVICE AND METHOD FOR TREATING MEAT

(76) Inventor: Franz Kindermann, Strasse 2a, Wurmannsquick (DE) D-84329

( * ) Notice: Subject to any disclaimer, the term of this patent is extended or adjusted under 35 U.S.C. 154(b) by 0 days.

(21) Appl. No.: 11/156,269

(22) Filed: Jun. 17, 2005

(65) Prior Publication Data

US 2006/0003681 A1    Jan. 5, 2006

Related U.S. Application Data

(63) Continuation of application No. PCT/EP02/14494, filed on Dec. 18, 2002.

(51) Int. Cl.
*A22C 21/00*    (2006.01)

(52) U.S. Cl. ...................................... 452/142

(58) Field of Classification Search ............... 452/141, 452/142
See application file for complete search history.

(56) References Cited

U.S. PATENT DOCUMENTS

| | | | | |
|---|---|---|---|---|
| 4,348,787 A | * | 9/1982 | Wolff | 452/143 |
| 4,645,404 A | * | 2/1987 | Juravic | 414/416.05 |
| 4,672,716 A | * | 6/1987 | Dickey | 452/142 |
| 5,114,379 A | | 5/1992 | Prosenbauer | |
| 5,738,578 A | * | 4/1998 | Marchese | 452/142 |
| 6,036,591 A | * | 3/2000 | Bonon et al. | 452/142 |
| 6,257,132 B1 | * | 7/2001 | Bifulco | 100/161 |
| 6,601,499 B1 | * | 8/2003 | Bifulco | 100/73 |

FOREIGN PATENT DOCUMENTS

| EP | 0930015 A2 | 7/1999 |
|---|---|---|
| EP | 1090554 A1 | 4/2001 |

* cited by examiner

*Primary Examiner*—Thomas Price
(74) *Attorney, Agent, or Firm*—Townsend and Townsend and Crew LLP

(57) ABSTRACT

Embodiments of the invention provide a more efficient method for treating meat. In one embodiment, a rolling device includes several rolling units comprising in turn several rollers. To optimize the treatment process, sheeting with a degree of play is placed over the rolling units. Smoothing rollers can be provided at the end of the meat treatment nip.

20 Claims, 3 Drawing Sheets

MEAT ROLLING DEVICE AND METHOD FOR TREATING MEAT

CROSS-REFERENCES TO RELATED APPLICATIONS

This application is a continuation of, and claims priority under 35 U.S.C. § 120 from, International Patent Application No. PCT/EP2002/014494, filed Dec. 18, 2002, the entire disclosure of which is incorporated herein by reference.

BACKGROUND OF THE INVENTION

The invention relates to a meat rolling device for processing pieces of meat. The device especially serves for tendering fresh meat without bone portion in the field of food with simultaneous surface increase.

The structure of fresh meat processed with such a device is lastingly changed or relaxed (tendered), respectively, and the meat appears to be softer and more tasteful upon consumption. With fresh meat of very different kind, however primarily meat from cow and pork, lasting quality improvement is achieved.

From DE A 33 44 284, a device for treating meat or ham is known, which is provided with a rack, in which at least two oppositely rotating rollers spaced side-by-side are disposed, between which the material to be treated is passed. The rollers are formed as pressure rollers and the distance thereof is mutually adjustable. The pressure rollers can be exchangeably attached in the rack, for which each pressure roller is connected to the drive shaft via a quick coupling on the drive side and is supported in a bearing assembly detachably connected to the rack on the other side. The pressure rollers can be provided with ribs, knobs, projections and the like on their peripheral walls. The ribs extending at least partially over the length of the pressure rollers are at least approximately rectangular, acute or frustum-like in cross-section. The disadvantage of this meat processing device is that the meat cells of the processed piece of meat are destructed by squeezing such that very much cell liquid escapes and thereby the storability of the processed piece of meat greatly decreases.

By the rolling operating, effective surface increase of the processed piece of meat (e.g. escalope meat from pork, pork neck steaks, pork tenderloin, beef tenderloin and the like) results. By the employment of such a rolling device, manual meat beating is spared, wherein the fresh meat is flattened in its consistency by beating action with the corresponding working tool. Therein, massive escape of cell liquid occurs. This escape of cell liquid in turn results in contaminated working place and in measurable lost of weight of the processed fresh meat after beating of meat. Beaten fresh meat also easily dries out.

Another advantage of a rolling device over the usual meat beating is in the far less time and force requirement and the working manner far gentler to the body in processing meat. It has also taken care of the tendons and joints of the beating person partially overstressed in the usual beating operation.

In this context, from European patent application EP 00 121 256, a meat roller is known, which includes a roller jacket in the form of a cylinder and a plurality of roller teeth on the surface of the roller jacket, which substantially extend along the axis of the cylinder, wherein each one of the plurality of roller teeth has a first surface lying substantially on a plane through the axis of the cylinder, and a second surface disposed substantially perpendicularly to a first surface of a roller tooth adjacent in circumferential direction.

BRIEF SUMMARY OF THE INVENTION

A feature of the present invention is to provide a device, by which tendering of pieces of meat can be performed effectively, and the loss of cell liquid in processing is kept as low as possible.

According to an aspect of the invention, a meat rolling device includes at least two rolling mechanisms each having at least two parallel rollers, wherein the at least two rolling mechanisms face each other with formation of a nip, through which a piece of meat to be processed can be conveyed, and processing teeth on the surface of the rolling mechanisms extending substantially parallel to the roller axes, and which each have a first surface and a second surface, wherein the first surface of each processing tooth is disposed substantially perpendicularly to the second surface of a processing tooth adjacent in the circumferential direction.

According to another aspect of the invention, there is provided a method for tendering meat, including a meat rolling device as mentioned above, by portion-wise gripping a piece of meat to be processed by a tooth edge of the rolling mechanism provided with processing teeth, pressing the gripped portion of meat by a tooth side adjoining the tooth edge, and stretching the pressed portion of meat by hooking-in by means of the tooth edge.

By the formation of the processing teeth according to embodiments of the invention on the rolling mechanisms, the pieces of meat are portion-wise drawn into the nip. In the nip, the meat flows apart transversely to the processing direction according to the applied pressure, i.e. in axial direction of the rollers. Upon leaving the nip, the meat is drawn apart by the processing teeth, which diverge there and form barbs, thereby further tendering the piece of meat.

The processing teeth can be integrally connected to the respective roller. However, there is also the possibility that the processing teeth are disposed on the surface of a processing belt spanning the rollers of a rolling mechanisms. In the latter case, the rollers are only configured as guide rollers for the processing belt. This has the advantage that it can be exchanged more easily than the plural rollers.

Advantageously, each rolling mechanism respectively includes three or more rollers disposed linearly with respect to each other. Thereby, three roller pairs are substantially formed, by which the rolling operation can be performed more gently than with a single roller pair.

The nip formed by the rollers conveniently is variably adjustable. Thereby, different kinds of pieces of meat such as beefs olive and escalopes can be processed with equal efficacy.

Preferably, the nip is configured slightly V-shaped. Thereby, also the rollers disposed at the end in the roller chain or roller pairs maintain their intended effect, respectively, since the piece of meat becomes slightly thinner after each rolling operation.

The contact pressure of the rolling mechanisms with respect to each other can be adjustable. Thereby, very different sorts of meat can be accommodated.

An envelope can surround each of the roller mechanisms preferably with a predefined or adjustable backlash. Thereby, it can be controlled how far the piece of meat is drawn around a roller in the rolling operation. With the envelope, it can also be influenced to which extent the structure of the meat is destructed or changed by drawing, respectively. The envelope can have a plastic sheet and/or a textile material. It has the advantage that the teeth are not covered by torn-off pieces of meat in processing. Finally, this improves the processing quality and reduces the cleaning effort.

Advantageously, all of the rollers are separately driven. This causes the meat to be treated to be uniformly conveyed through the meat rolling device and the optionally employed envelope to obtain a longer lifetime.

Certain advantages also result if the plurality of processing or roller teeth, respectively, is uniformly disposed on the circumference of the roller jacket with or without clearance. Further, the roller teeth can extend over the entire jacket length or only a portion thereof, and the roller teeth can preferably be formed integrally from the roller body. Moreover, the meat rollers opposing with respect to processing are conveniently disposed substantially identically and anti-parallel with respect to the roller teeth.

For making a pleasant surface of the processed pieces of meat, they are conveniently smoothed at the end of processing. This is either effected by conveying the processed piece of meat reversely from the roller nip with reversing the processing direction. Alternatively, there is the possibility that smoothing rollers or rolling mechanisms with smoothing processing belts with or without teeth are disposed at the end of the processing nip such that the processing direction does not have to be reversed.

DETAILED DESCRIPTION OF THE INVENTION

Figure 1:
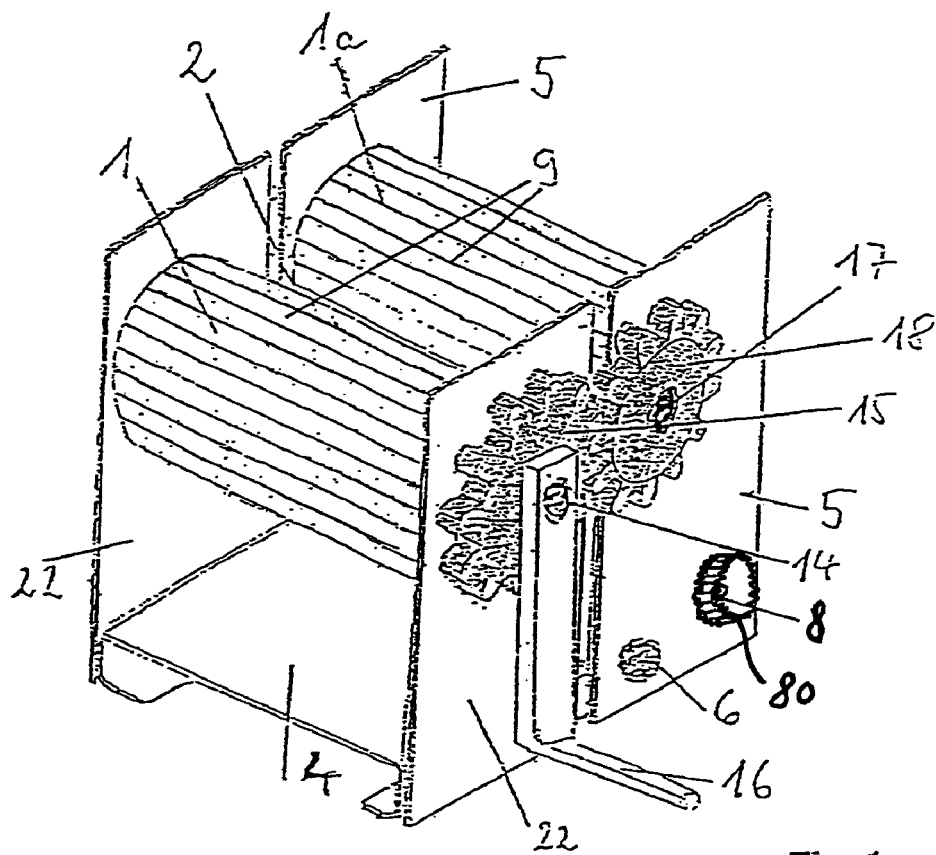
FIG. 1 a perspective view of a conventional meat rolling device.

First, a conventional meat rolling device is illustrated for better explaining the invention. According to FIG. 1, a conventional meat rolling device includes two parallel opposing toothed rollers 1, 1a, wherein a differently broad roller nip or spacing 2 is adjustable between the two rollers. The desired contact pressure of the rollers on the fresh meat is regulated by changing the width of the roller nip 2. Optionally, spring mechanisms may be appropriately used for this.

Both rollers are supported by slide bearings in the corresponding side parts on both sides. A side part pair 22 are rigidly fixed to the bottom plate 4. The fixed roller 1 is supported on this side part pair 22. The passive roller 1a disposed parallel to the fixed roller 1 is driven through the roller 1. A side part pair 5, between which the passive roller 1a is located, is movably attached to the bottom plate 4 by supporting bolts 6.

Figure 2:
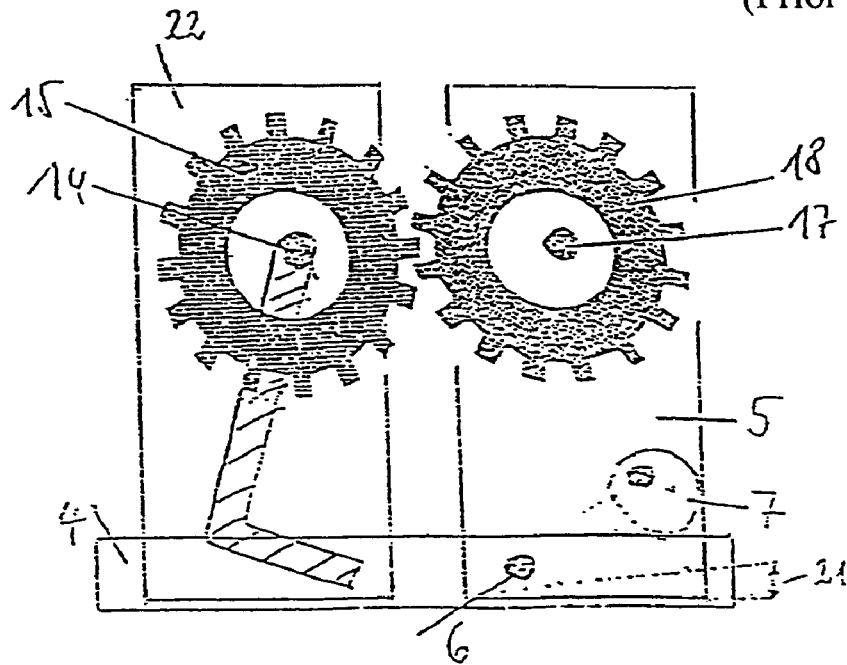
FIG. 2 a side view of the meat rolling device.

An elevation inclination 21 of this supported side part pair 5 is achieved by eccentric rollers 7 according to FIG. 2, which are attached to a continuous shaft 8. By rotating a lateral star wheel 80, the side parts 5 are changed parallel in their elevation inclination 21 through the eccentric rollers 7. Thereby, the roller nip 2 is changed in its width. Both rollers are each only toothed 9 in the longitudinal direction of the roller. The toothing 10 of the rollers according to FIG. 3 extends according to their rotational direction 13 identically.

As the tooth depth 11, a standard measure of about 0.8 to 4 mm is vertically provided. It is noted that smaller and greater tooth depths are conceivable.

Figure 4:
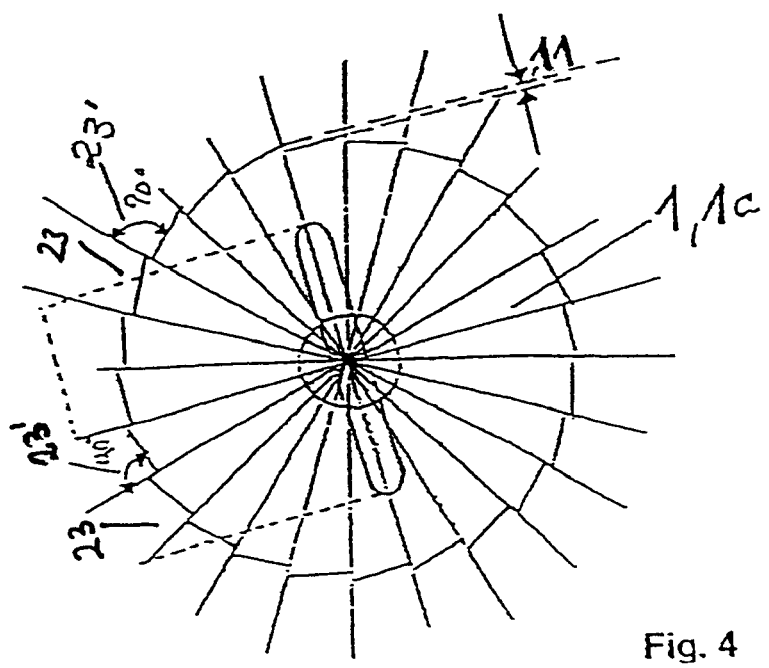
FIG. 4 a cross-section through a meat roller.

A roller tooth 23 to the adjacent roller tooth 23' in circumferential direction results in a 90° angle (plus or minus 5° deviation) according to FIG. 4. The tooth surfaces can also be arched, which can be achieved by an appropriate shape of the milling tool for the roller.

The roller teeth 10 grip the fresh meat to be processed by opposite movement of the rollers, 1, 1a and move it, like the action of a harpoon, reliably into the roller nip 2. Thereby, the feed of the rolling material is allowed in a straightforward manner. The number of the roller teeth per roller depends on the respectively selected roller diameter. With a roller diameter 12 of, e.g., about 10 cm, the number of teeth is typically about 20–25 pieces. The rollers 1, 1a are moved opposite to each other 13 in the working operation. Therein, the roller teeth 10 face each other. By providing an appropriate shape of the roller teeth and by the fact that the roller teeth 10 are only toothed in one direction, the pieces of meat also cannot attach and the pieces of meat also cannot accumulate. Thereby, also effective increase in surface area of the processed fresh meat is possible, because the rolling material can "extend" into the grooves of the roller teeth. In this rolling operation, the processed fresh meat is "kneaded thoroughly" through the roller nip 2. By this working operation, the structure of the fresh meat is also relaxed or tendered. One advantageous feature of the device especially results from the particular configuration of the roller shape features 1, 1a, 9, 10, 11, 13 and 23.

The axis 14 of the fixed roller 1 has a drive gear 15 on the one outer side of the side wall. The device is driven via a connection/intermediate piece from the drive gear 15 to the actual drive. The drive can be effected both mechanically, e.g., by a crank 16, and electrically.

On the axis 17 of the passive roller 1a, there is also located a gear 18 on the same outer side of the side wall 5 of the device, which is driven by the drive gear 15. The course of movement of the gears 15, 18 is thereby opposite in the rotational direction. The entire device is attached to the subsoil 19, e.g., through suction cups, clamps, screws, or similar attaching material. All of the used materials, of which the device is constructed, consist of food-compatible materials. The device can be easily disassembled and cleaned.

Figure 5:
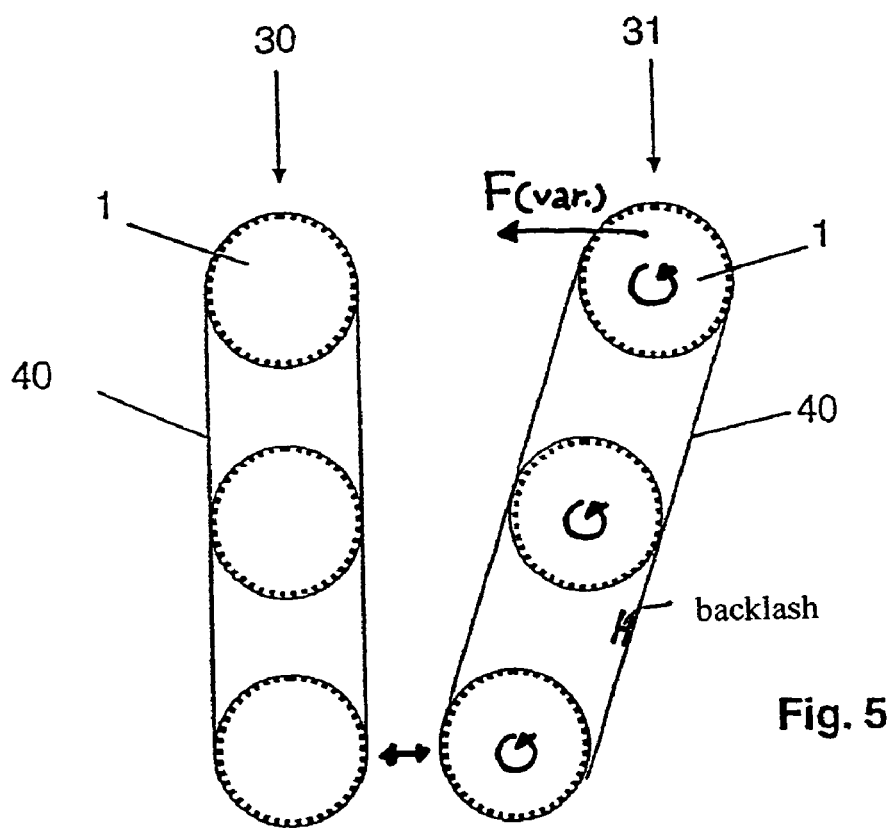
FIG. 5 a cross-sectional draft through a meat rolling device according to an embodiment of the invention.

In FIG. 5, there is now illustrated a meat rolling device according to an embodiment of the present invention. Therein, the individual components substantially correspond to those described in connection with FIGS. 1 to 4, so that more detailed description can be omitted here.

The meat rolling device according to FIG. 5 includes two rolling mechanisms 30 and 31. Each one has three rollers 1, respectively. A band-like envelope 40 passes over all of the rollers 1 of each of the rolling mechanisms 30 and 31. However, the rolling mechanisms 30 and 31 can also be operated without the envelopes 40.

The two rolling mechanisms 30 and 31 are disposed in a V-shaped arrangement. The angle to each other is variable. Moreover, also the distance between the two rolling mechanisms 30 and 31 is variably adjustable. In the present example, the first rolling mechanism 30 is rigid, while the second rolling mechanism 31 is movable.

The individual rollers 1 have teeth similar to those in FIG. 4. However, it is also possible to provide the individual rollers with different teeth or no teeth, such that, for example, only one side of the piece of meat is processed in a rolling operation.

In FIG. 5, three rollers 1 per rolling mechanism 30, 31 are illustrated. However, the number of rollers can also be reduced to two or increased to four, five, etc., per rolling mechanism. Moreover, the rollers do not have to be opposed in pairs in the rolling mechanisms. They can also be disposed in an offset manner, so that the piece of meat is conveyed in S-shaped manner through the rolling device. Further, two rollers can be provided in one rolling mechanism, and in the other rolling mechanism, only one roller can be provided.

In the embodiment, all of the rollers 1 are connected to each other and driven by a transmission not shown. However, principally, not all of the rollers have to be driven. Here, the drive can also be effected manually or by the aid of a motor.

According to FIG. 5, the meat rolling device is disposed vertically. However, it can also be horizontally installed in a meat processing equipment, for example, to remove pieces of meat from a conveyor belt.

For smoothing the processed piece of meat, the respectively lowermost roller of each rolling mechanism 30, 31 can be provided with a tooth alignment oppositely directed with respect to the other rollers. However, these rollers can also be formed without processing teeth.

Figure 3:
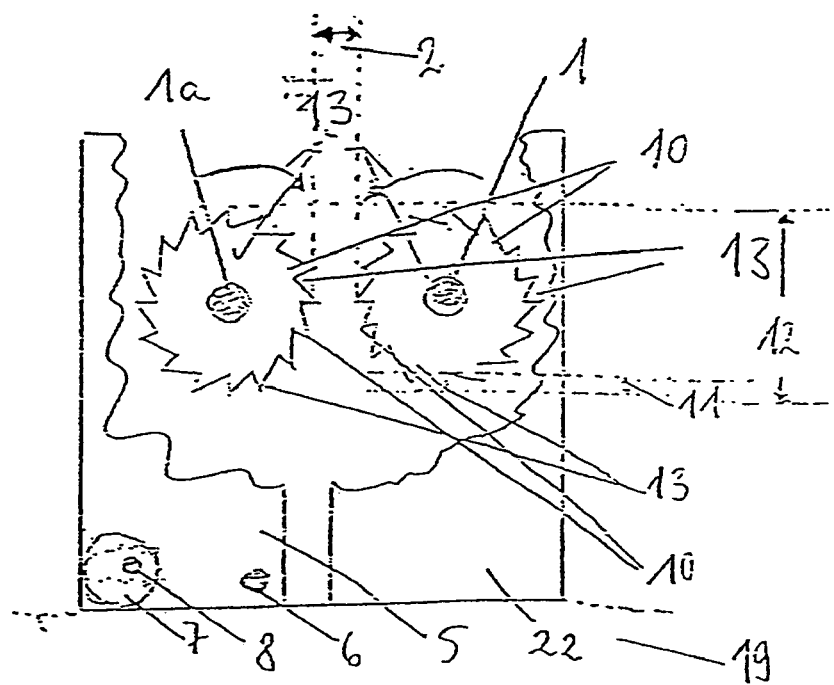
FIG. 3 a partial cross-sectional view of the meat rolling device.

The alignment of the roller teeth and the rotational direction of the rollers at least of the two upper roller pairs of FIG. 5 corresponds to that of FIG. 3.

Figure 6:
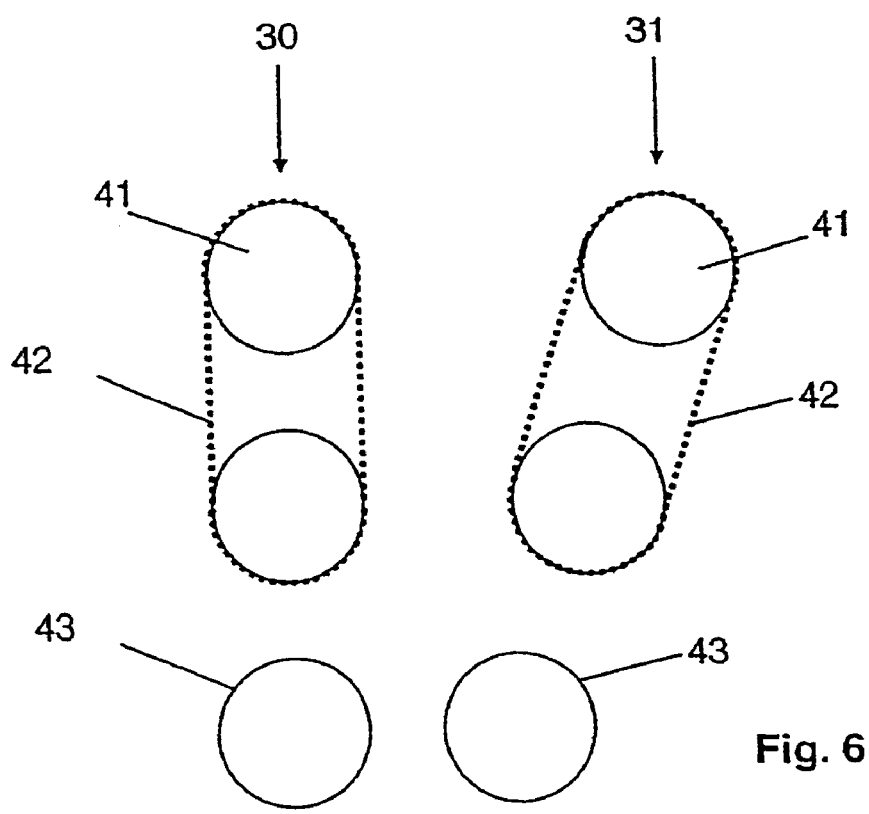
FIG. 6 a cross-sectional draft through an alternative meat rolling device according to another embodiment of the invention.

In FIG. 6, an alternative meat rolling device according to another embodiment of the invention is illustrated in cross-section. In this case, each rolling mechanism 30, 31 comprises two rollers 41 only configured as guide rollers. A processing belt 42 passes over them, which has substantially the same teeth as illustrated in FIG. 4. The alignment of the teeth of rollers opposed with respect to the processing nip corresponds to that of FIG. 3.

A smoothing roller pair with the rollers 43 follows the rolling mechanism 30, 31. In this embodiment, the smoothing rollers 43 do not have any processing teeth.

Any combinations of the rollers and rolling assemblies illustrated in context with FIGS. 5 and 6 are conceivable. Also, the meat rolling device is not restricted to three roller pairs.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A meat rolling device including
at least two rolling mechanisms each having at least two parallel rollers, wherein the at least two rolling mechanisms are facing each other with formation of a nip, through which a piece of meat to be processed can be conveyed,
wherein processing teeth on the surface of the rolling mechanisms extend substantially parallel to roller axes of the rollers, and each processing tooth has a first surface and a second surface, wherein the first surface of a processing tooth is disposed substantially perpendicularly to the second surface of another processing tooth adjacent in a circumferential direction of the rolling mechanism, and wherein a band-like configured envelope respectively surrounds each rolling mechanism on an outer circumference thereof.

2. A meat rolling device according to claim 1, wherein the band-like configured envelope has a plastic sheet and/or a textile material.

3. A meat rolling device according to claim 1, wherein the processing teeth are integrally connected to the respective roller.

4. A meat rolling device according to claim 1, wherein the processing teeth are disposed on the surface of a processing belt spanning the rollers of at least one of the rolling mechanisms.

5. A meat rolling device according to claim 1, wherein each rolling mechanism respectively includes three or more rollers arranged linearly with respect to each other.

6. A meat rolling device according to claim 1, wherein the nip between the rolling mechanisms is variable.

7. A meat rolling device according to claim 1, wherein the nip between the rolling mechanisms is substantially V-shaped.

8. A meat rolling device according to claim 1, wherein each envelope surrounds the respective rolling mechanism with a preset or adjustable backlash.

9. A meat rolling device according to claim 1, wherein the contact pressure of the rolling mechanisms to each other is adjustable.

10. A meat rolling device according to claim 1, wherein all of the rollers are driven.

11. A meat rolling device according to claim 1, wherein each rolling mechanism has a roller smoothing the piece of meat to be processed at the processing end.

12. A meat rolling device according to claim 1, wherein a roller pair smoothing the piece of meat to be processed or a smoothing rolling mechanism with at least one smoothing processing belt follows the rolling mechanism at the processing end.

13. A meat rolling device according to claim 1, wherein the rolling mechanism can be driven for reversing the processing direction for smoothing the piece of meat to be processed.

14. A method for tendering meat using a meat rolling device as recited in claimed 1, the method comprising:
conveying a piece of meat to be processed through the nip;
portion-wise gripping the piece of meat to be processed by a tooth edge of each rolling mechanism provided with the processing teeth,
pressing the gripped portion of meat by a tooth side adjoining the tooth edge, and
stretching the pressed portion of meat by hooking-in with the tooth edge and controlling the stretching by adjusting backlash of the envelopes around the rolling mechanisms.

15. A method according to claim 14 wherein each processing tooth has a first surface and a second surface, and wherein the first surface of a processing tooth is disposed substantially perpendicularly to the second surface of another processing tooth adjacent in a circumferential direction of the rolling mechanism.

16. A method according to claim 14, further comprising varying the nip between the rolling mechanisms.

17. A method according to claim 14, further comprising arranging the rolling mechanisms to form a V-shaped nip.

18. A method according to claim 14, further comprising adjusting the contact pressure of the rolling mechanisms relative to each other.

19. A method according to claim 14, further comprising driving all of the rollers.

20. A method according to claim 14, further comprising smoothing the piece of meat using a pair of rollers after conveying the piece of meat through the nip.

* * * * *